US00RE50671E

(19) United States
(12) Reissued Patent
Li

(10) Patent Number: US RE50,671 E
(45) Date of Reissued Patent: Nov. 25, 2025

(54) OFFICE CHAIR

(71) Applicant: Yong Li, Huzhou (CN)

(72) Inventor: Yong Li, Huzhou (CN)

(21) Appl. No.: 29/989,499

(22) Filed: Feb. 13, 2025

Related U.S. Patent Documents

Reissue of:
(64) Patent No.: Des. 1,040,542
Issued: Sep. 3, 2024
Appl. No.: 29/938,856
Filed: Apr. 23, 2024

(30) Foreign Application Priority Data

Apr. 3, 2024 (CN) ..... 202430180954.X

(51) LOC (15) Cl. ..... 28-01
(52) U.S. Cl.
USPC ..... D6/366
(58) Field of Classification Search
USPC ..... D6/334, 335, 337, 340, 341, 344–356, D6/358, 368
CPC .... A47C 1/00; A47C 5/00; A47C 7/00; A47C 7/02; A47C 7/16; A47C 7/18; A47C 7/24; A47C 7/36; A47C 7/40; A47C 7/50; A47C 7/54
See application file for complete search history.

(56) References Cited

U.S. PATENT DOCUMENTS

D372,799 S * 8/1996 Orians ..... D6/366
D415,372 S * 10/1999 Zaidman ..... D6/365
D415,373 S * 10/1999 Zaidman ..... D6/365
D481,231 S * 10/2003 True ..... D6/366
D495,168 S * 8/2004 True ..... D6/366
D504,040 S * 4/2005 True ..... D6/366
D508,351 S * 8/2005 True ..... D6/365
D508,352 S * 8/2005 True ..... D6/366
D533,377 S * 12/2006 Egger ..... D6/366
D535,127 S * 1/2007 Egger ..... D6/366
D535,501 S * 1/2007 Egger ..... D6/364
D535,502 S * 1/2007 Egger ..... D6/364
D536,200 S * 2/2007 Vong ..... D6/366
D537,662 S * 3/2007 McDiarmid ..... D6/366
(Continued)

OTHER PUBLICATIONS

Office Chair by Efomao Store, first available: Mar. 30, 2023. Amazon.com [online], [site Visited Jun. 8, 2024], Internet URL: https://www.amazon.com/Efomao-Ergonomic-Computer-Executive-Adjustable/dp/B0BZYQX2H4/ref=sr_1_98_sspa (Year: 2023).*
(Continued)

*Primary Examiner* — Darlington Ly
(74) *Attorney, Agent, or Firm* — Sang Young Han

(57) CLAIM

The ornamental design for a office chair, as shown and described.

DESCRIPTION

FIG. 1 is a front, top, and right perspective view of an office chair showing my new design;
FIG. 2 is a rear, bottom, and left perspective view thereof;
FIG. 3 is a front elevational view thereof;
FIG. 4 is a rear elevational view thereof;
FIG. 5 is a left side elevational view thereof;
FIG. 6 is a right side elevational view thereof;
FIG. 7 is a top plan view thereof;
FIG. 8 is a bottom plan view thereof; and,
FIG. 9 is a front, top, and right perspective view of the office chair in a state of use.
The broken lines in the drawings illustrate the portions of the office chair, which form no part of the claimed design.

1 Claim, 9 Drawing Sheets

Figure 1:
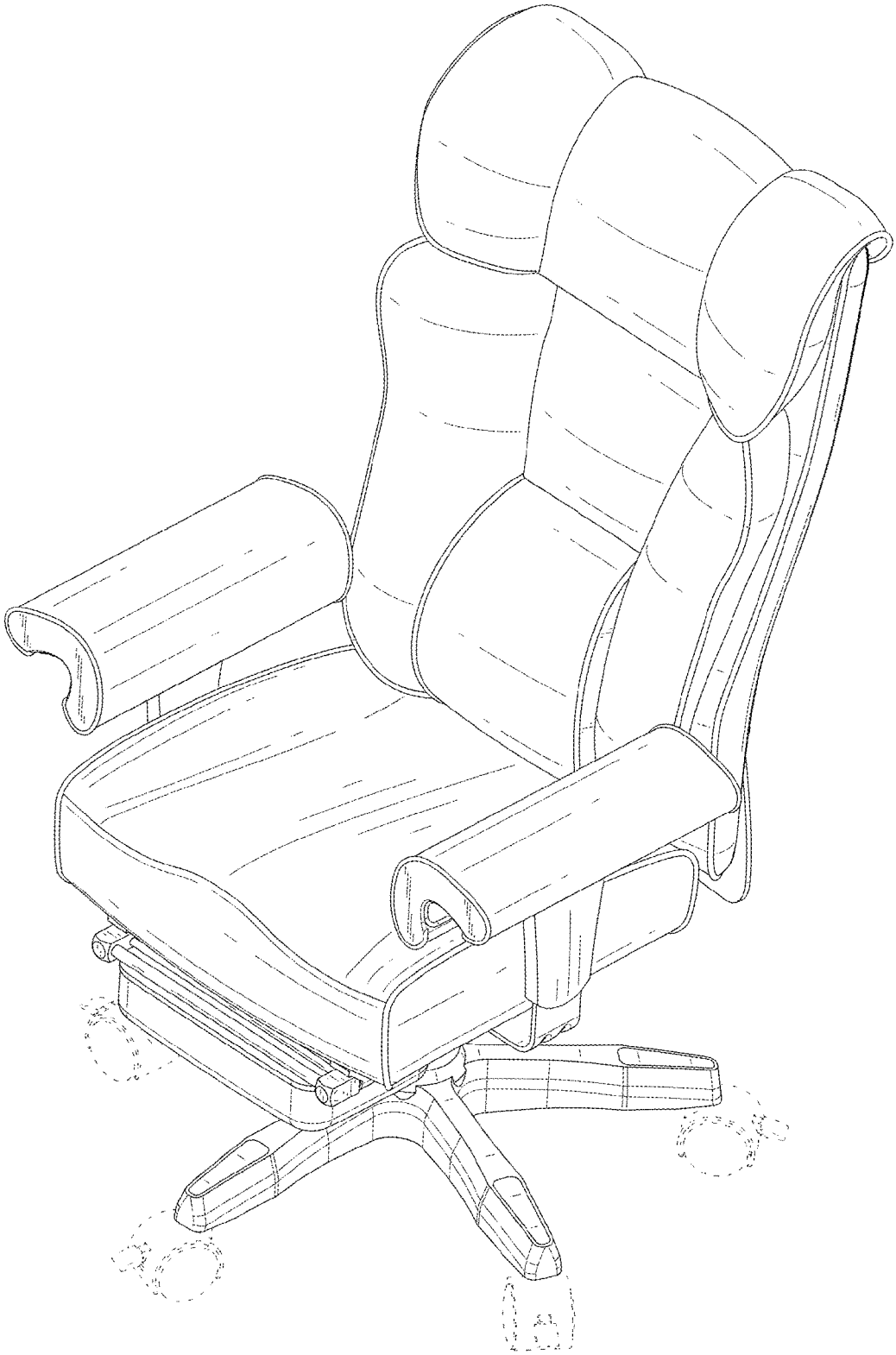
Figure 2:
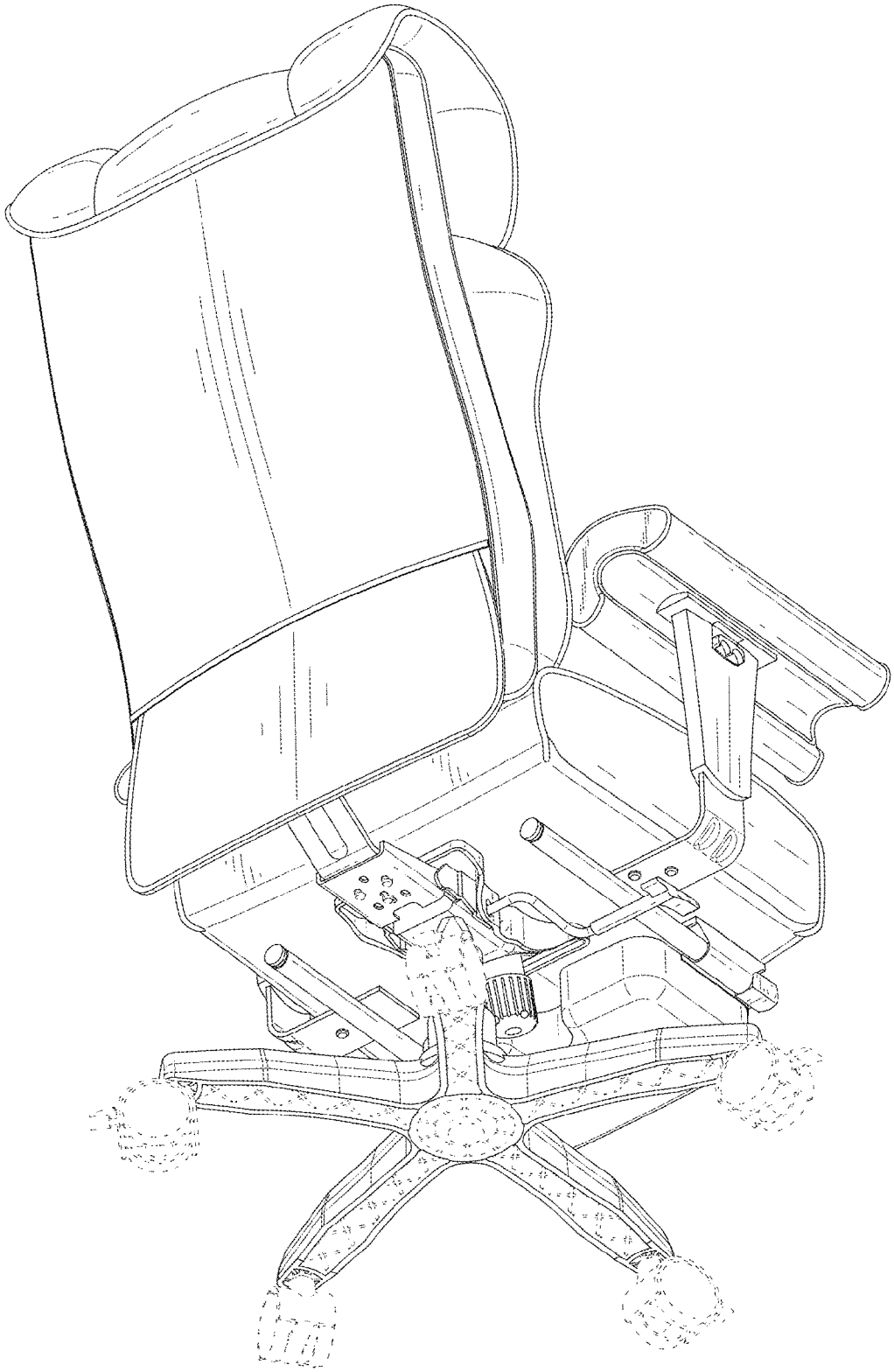
Figure 3:
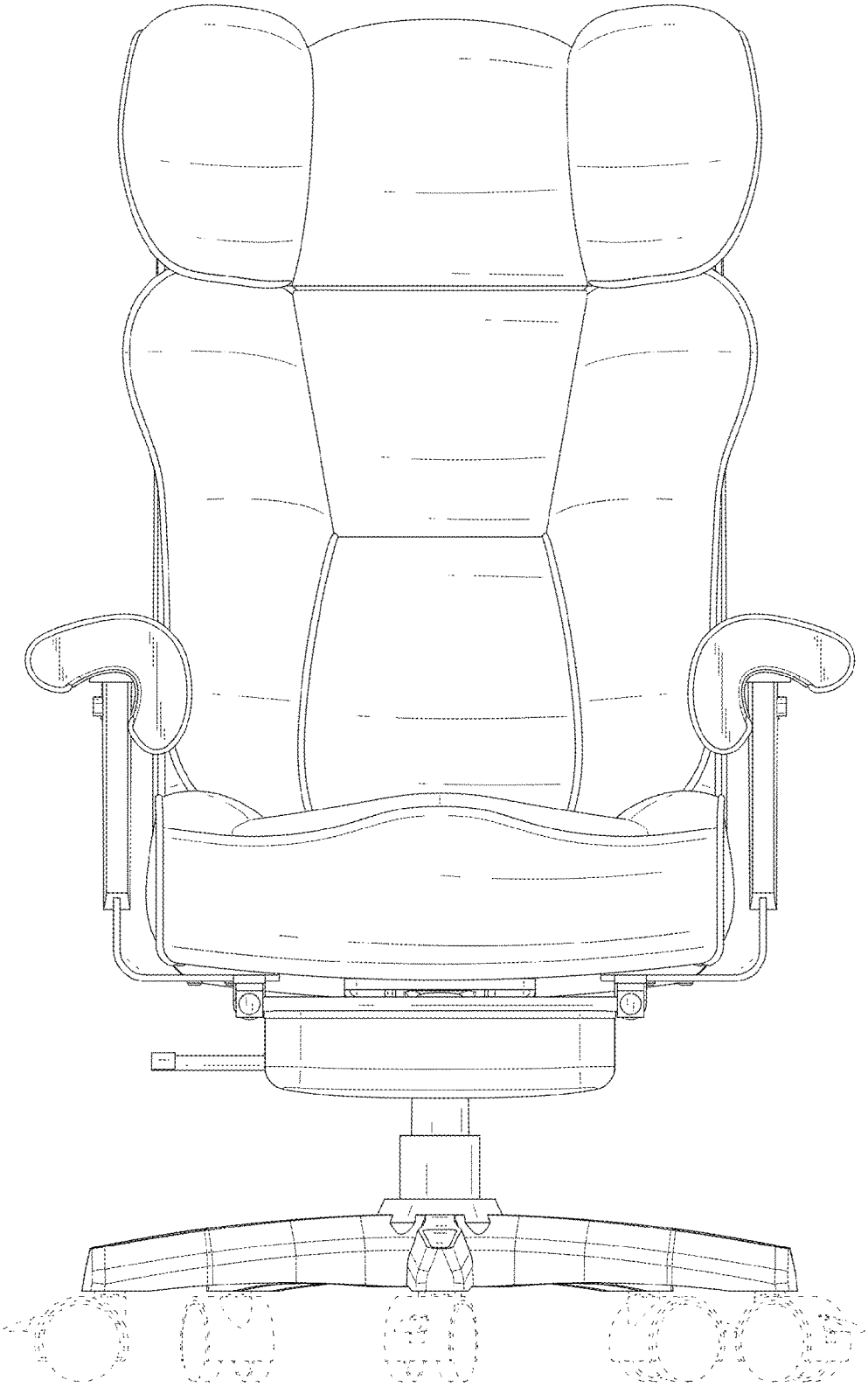
Figure 4:
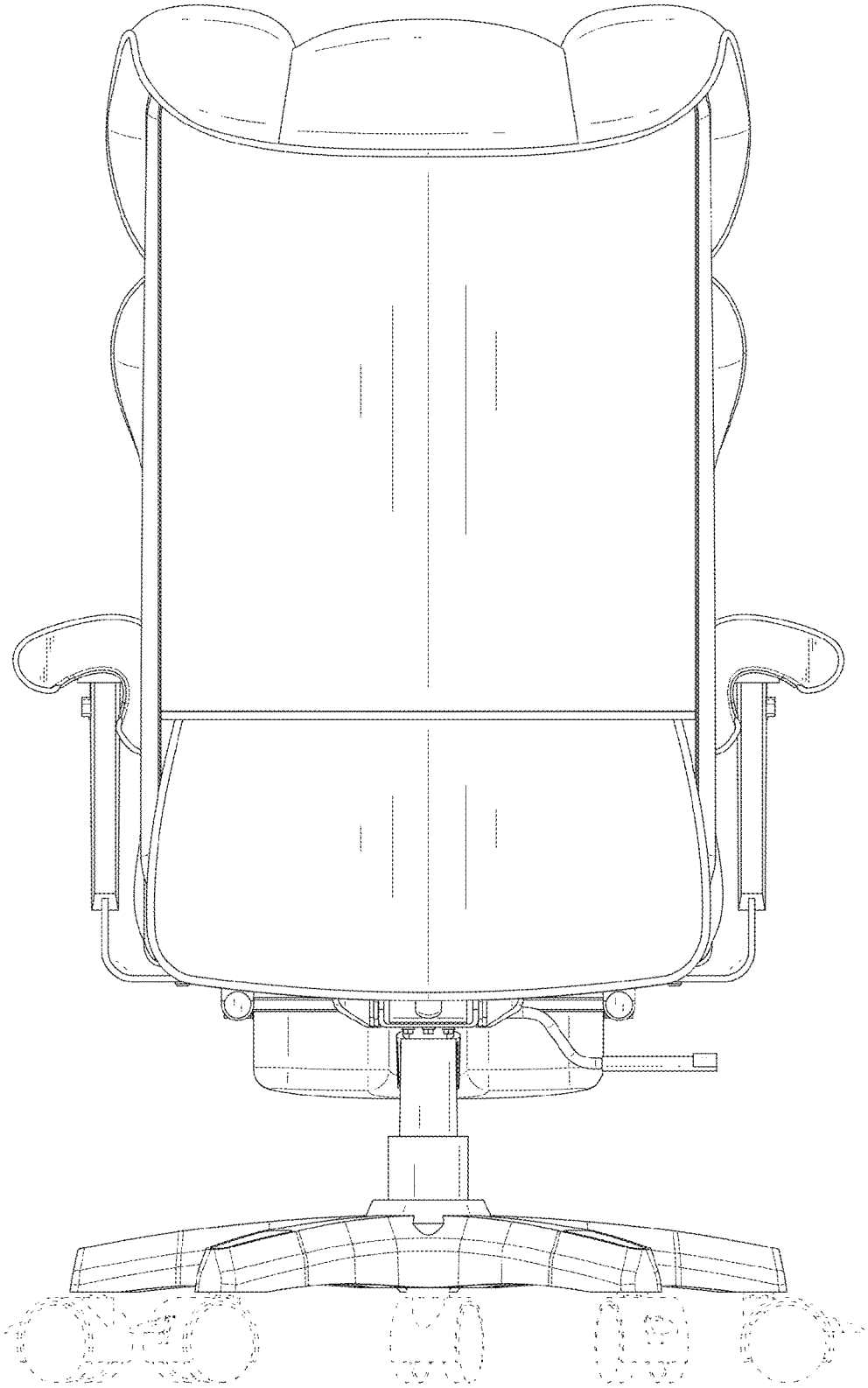
Figure 5:
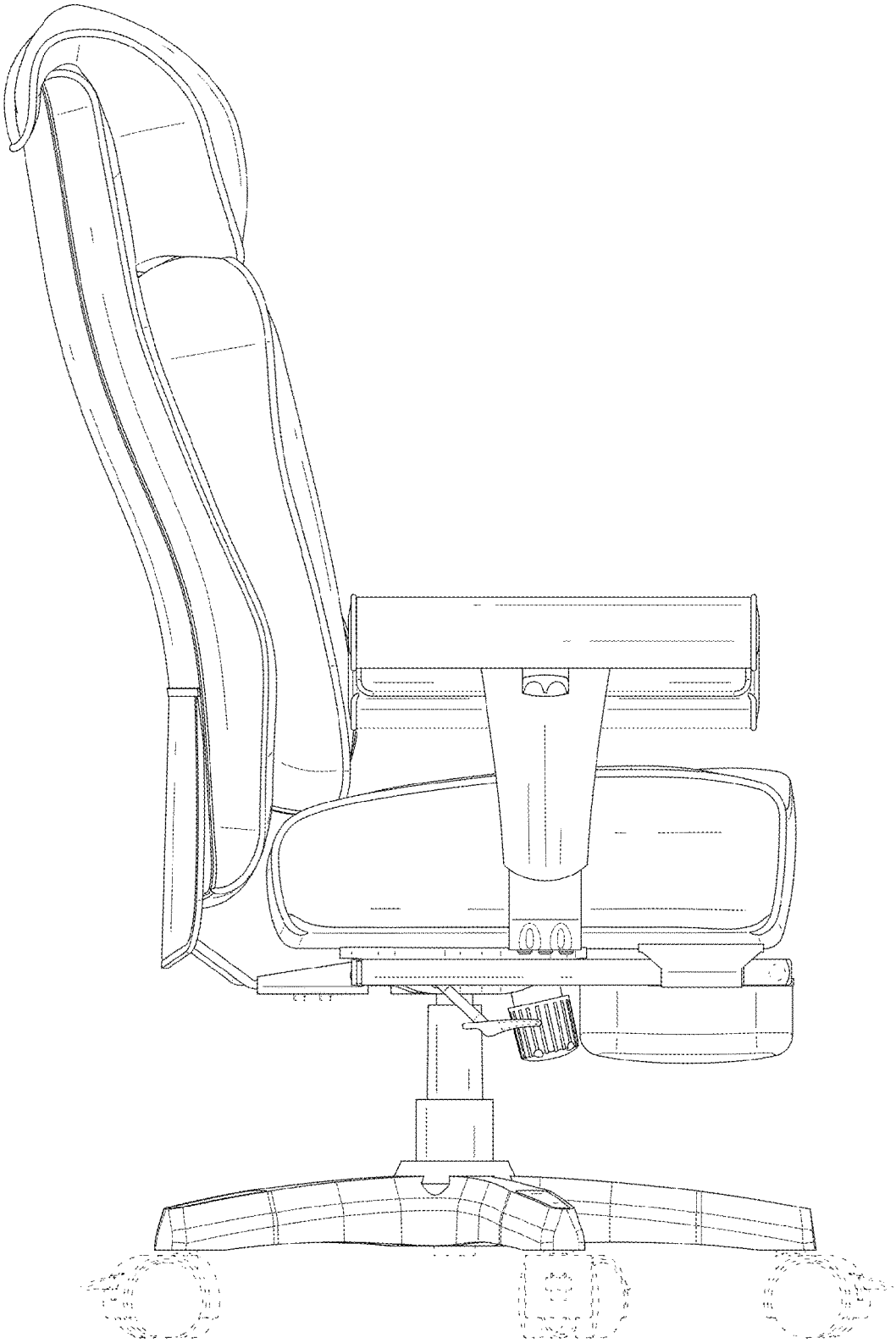
Figure 6:
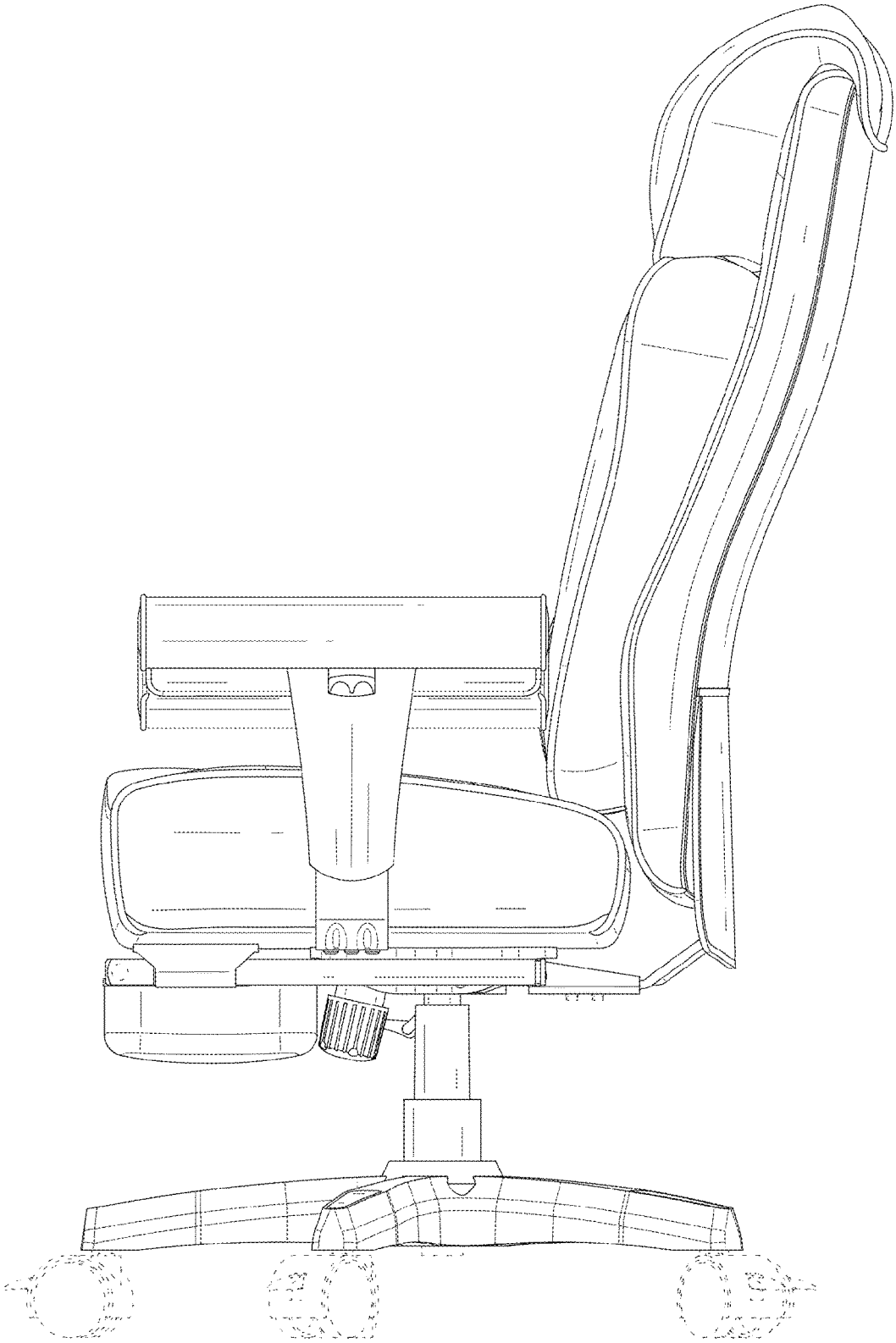
Figure 7:
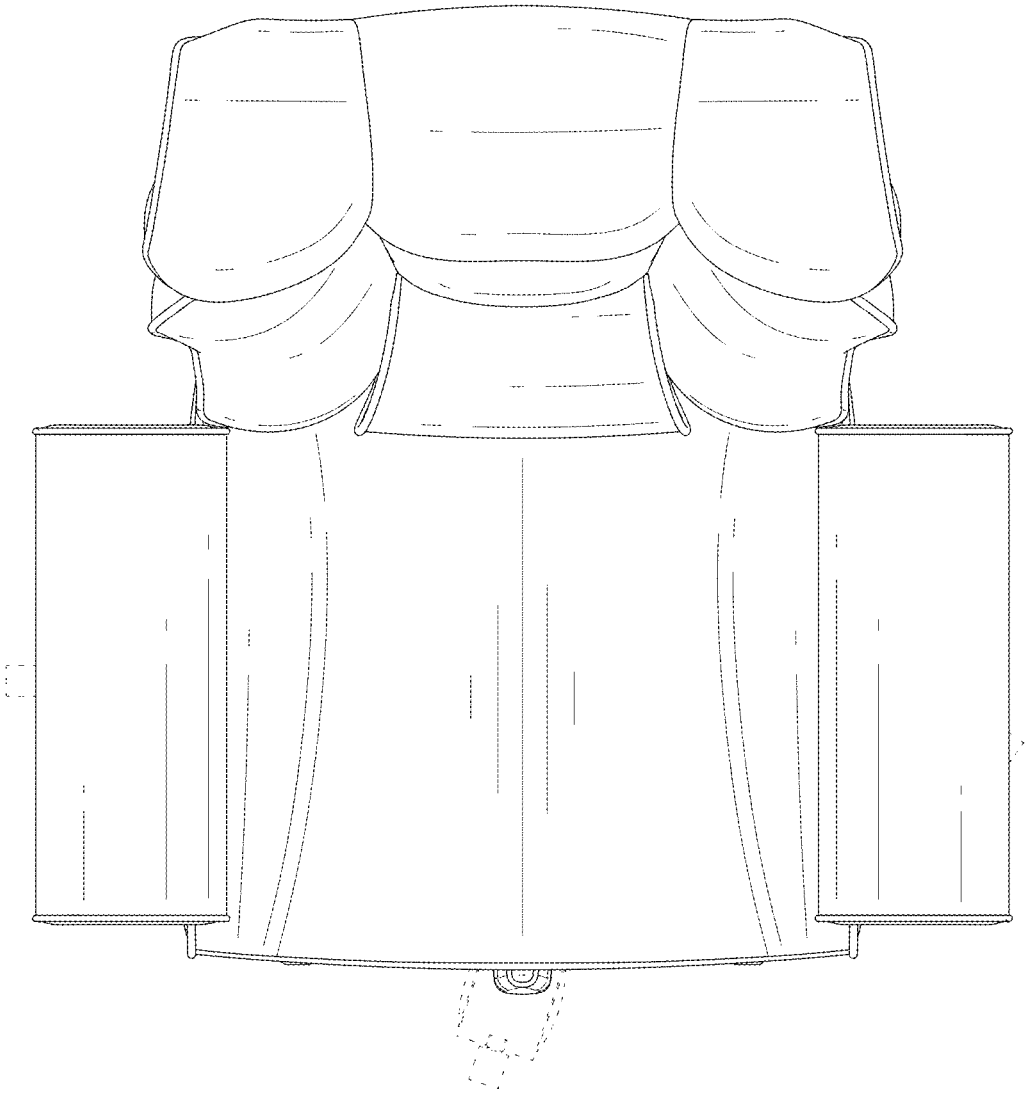
Figure 8:
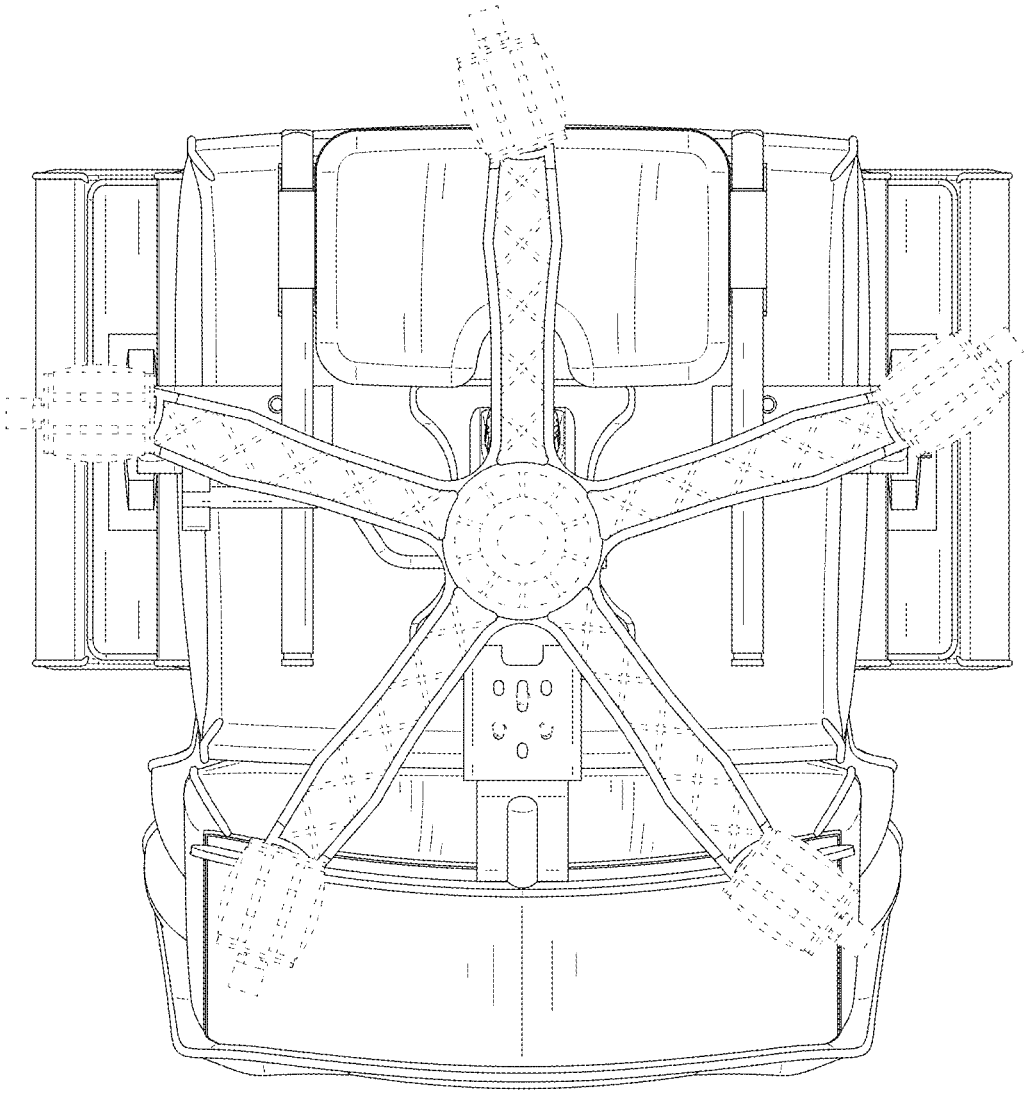
Figure 9:
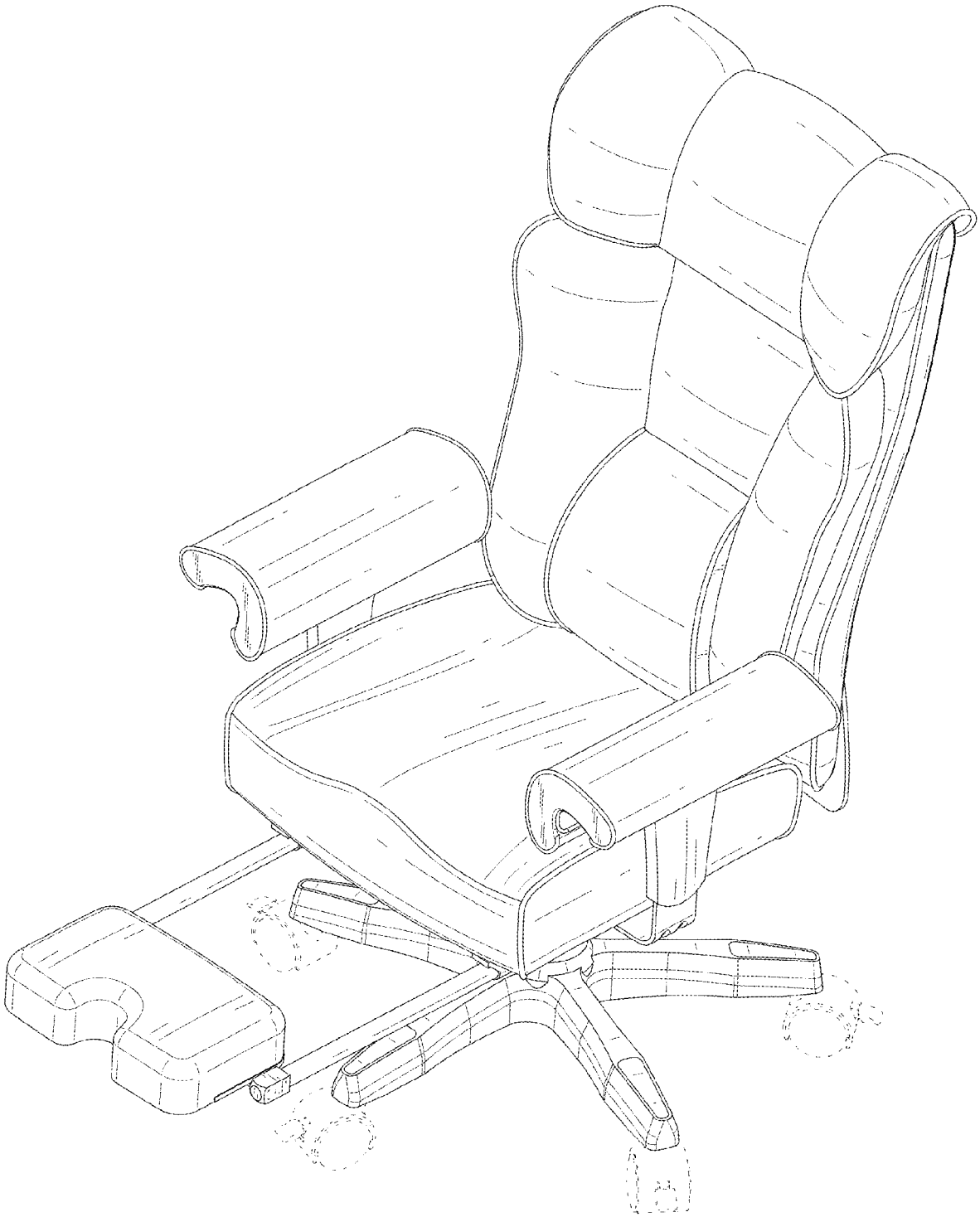

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D538,558 | S | * | 3/2007 | Egger | D6/366 |
| D540,073 | S | * | 4/2007 | McDiarmid | D6/366 |
| D540,076 | S | * | 4/2007 | Mazzera | D6/716.3 |
| D542,063 | S | * | 5/2007 | Smith | D6/716.3 |
| D543,060 | S | * | 5/2007 | Mazzera | D6/716.3 |
| D557,947 | S | * | 12/2007 | Egger | D6/366 |
| D572,050 | S | * | 7/2008 | Tamara | D6/366 |
| D657,580 | S | * | 4/2012 | Zhou | D6/366 |
| D657,595 | S | * | 4/2012 | Ping | D6/365 |
| D657,982 | S | * | 4/2012 | Ping | D6/365 |
| D658,409 | S | * | 5/2012 | Ping | D6/365 |
| D661,133 | S | * | 6/2012 | Ping | D6/365 |
| D671,774 | S | * | 12/2012 | Ping | D6/365 |
| D1,006,470 | S | * | 12/2023 | Li | D6/366 |
| D1,012,529 | S | * | 1/2024 | Peng | D6/716 |
| D1,049,672 | S | * | 11/2024 | Li | D6/366 |
| D1,059,926 | S | * | 2/2025 | Wu | D6/366 |
| D1,064,627 | S | * | 3/2025 | Lu | D6/366 |
| D1,075,384 | S | * | 5/2025 | Wang | D6/366 |
| D1,076,533 | S | * | 5/2025 | Wang | D6/366 |
| D1,084,685 | S | * | 7/2025 | Luo | D6/366 |
| D1,090,086 | S | * | 8/2025 | Zhou | D6/366 |
| 2014/0132050 | A1 | * | 5/2014 | Clark | A47C 3/18 29/428 |
| 2015/0282621 | A1 | * | 10/2015 | Miller | A47C 7/506 297/344.21 |

OTHER PUBLICATIONS

Executive Chair by Latitude Run, first available: Sep. 9, 2023. Wayfair.com [online], [site Visited Jun. 8, 2024], Internet URL: https://www.wayfair.com/furniture/pdp/latitude-run-asharam-executive-chair-w100538029.html (Year: 2023).*

Executive Home Office Chair by Newbulig Store, first available: Dec. 28, 2023. Amazon.com [online], [site visited Jun. 8, 2024], Internet URL: https://www.amazon.com/NEWBULIG-Executive-Home-Office-Chair/dp/B0CR3CN1X5/ref=sr_1_55 (Year: 2024).*

Faux Leather Executive Computer Chair by Red Barrel Studio, first available: Unknown. Wayfair.com [online], [site visited Jun. 8, 2024], Internet URL: https://www.wayfair.com/furniture/pdp/red-barrel-studio-faux-leather-executive-computer-chair-w100311174.html (Year: 2024).*

* cited by examiner